UNITED STATES PATENT OFFICE.

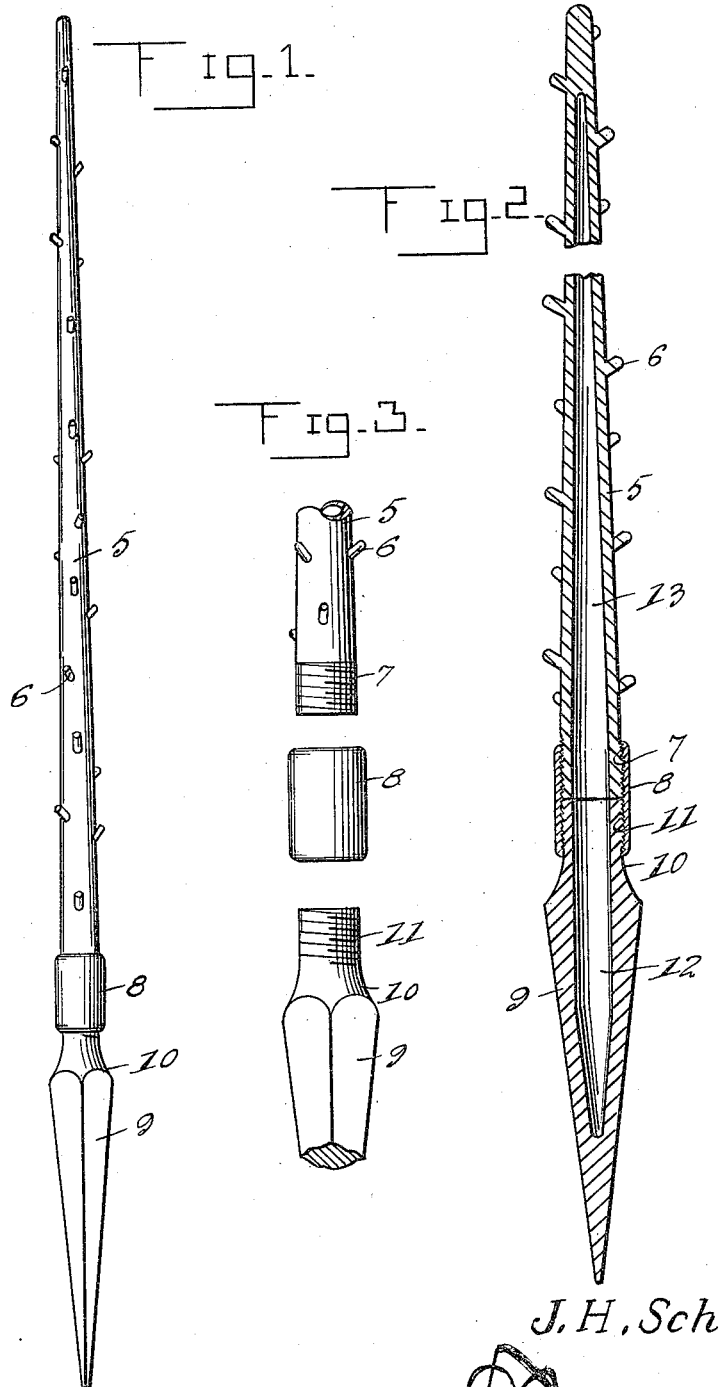

JOHN H. SCHAIBLE, OF CATONSVILLE, MARYLAND.

BEAN-POLE.

1,174,901.  Specification of Letters Patent.  Patented Mar. 7, 1916.

Application filed March 13, 1913.  Serial No. 754,114.

*To all whom it may concern:*

Be it known that I, JOHN H. SCHAIBLE, a citizen of the United States, residing at Catonsville, in the county of Baltimore and State of Maryland, have invented certain new and useful Improvements in Bean-Poles; and I do hereby declare the following to be a full, clear, and exact description of the invention, such as will enable others skilled in the art to which it appertains to make and use the same.

This invention relates to new and useful improvements in bean poles, and has for its object to provide a pole to take the place of the ordinary bean pole or trellises on which vines are adapted to be trained.

Another object of my invention is to provide a device which will be more durable, cheaper to manufacture and more easily put in place.

Heretofore it has been the practice of parties growing beans, vines or similar running plants to gather bushes on which the twigs and stems are left and train the plants over these but owing to the destructibility of these bushes it necessitates the user getting a new set every year and spending a a great deal of time and labor in this manner.

Another object of my invention is to eliminate the labor necessitated in gathering the bushes inasmuch as the pole which will be more fully hereinafter described is practically indestructible. and one set is enough to last for a number of years without being removed.

With the above, and other objects in view, I will now describe my invention in the annexed specification and drawings, in which,—

Figure 1 is a side elevation of my improved bean pole. Fig. 2 is a longitudinal section of the same, and Fig. 3 is a fragmental view of the same showing a detail of the connection.

Referring to the drawing by reference numerals, 5 designates the body of the bean pole constructed in accordance with my invention. The body 5 tapers from its lower to its upper end, and it is provided with a multitude of comparatively short vine supporting studs 6. The studs 6 are straight and circular in cross section. They extend from the body 5 in an outwardly and upwardly inclined direction, so as not to obstruct, retard, or in any way interfere with the curling of the vine about the body, and they are closely related and variously arranged so that each and every convolution of the vine is amply supported.

The lower end of the body 5 is screw-threaded, as shown at 7, to engage the socket 8 which is adapted to connect the body portion with the stake, which is adapted to enter the ground. This stake, which is indicated at 9, is preferably squared to form an elongated pyramid, the point of which is adapted to enter the ground and permit of easy positioning of the same. The end opposite the point is curved inwardly, as shown at 10, to form the reduced screw-threaded portion 11 which is adapted to enter the socket 8 at the end opposite the pole 7. This stake 9 is preferably bored, as shown at 12, to make the same lighter and use less material in its manufacture. The body portion of the pole 5 is also bored, as shown at 13, which will lighten the same and cheapen its construction.

In the manufacture of my device, the forms are made having indentations to form the studs 6. A core is formed to extend within the body portion 5 and form the longitudinal bore 13. Metal is then put in the forms and the whole is cast out of a solid piece, as indicated in the longitudinal section. The same is then removed from the forms and threads turned on the end 7, as clearly shown in Fig. 3. The stake 9 is formed in a similar manner to the body portion and is also provided with a screw threaded portion similar to the portion 7.

In use, each section is coupled with a coacting section and the stake 9 driven into the ground at the desired point, thus forming a substantially integral rigid upright pole upon which vines are adapted to climb. It will be understood that the sections are standardized so that in case of breakage the part which breaks may be renewed without the expense of obtaining an entirely new pole.

While in the foregoing I have shown and described the preferred embodiment of my invention, I wish it to be understood that I may change the specific arrangement of parts without in any way departing from the spirit and scope of my invention.

Having thus fully described my invention, what I claim is:—

1. As a new article of manufacture, a bean pole having a body which tapers from its lower to its upper end, and a multitude of vine supporting studs on the body, said studs extending from the body in an upwardly and outwardly inclined direction so that they will not form obstructions to the curling of the vine about the body, and said studs being closely related and variously arranged about the body so that each convolution of the vine will be amply supported.

2. As a new article of manufacture, a bean pole having a body which tapers from its lower to its upper end, and a multitude of comparatively short and round vine supporting studs on the body, said studs extending from the body in an upwardly and outwardly inclined direction so that they will not obstruct the curling of the vine about the body, and said studs being closely related and variously arranged about the body so that each convolution of the vine will be amply supported.

In testimony whereof I affix my signature in presence of two witnesses.

JOHN H. SCHAIBLE.

Witnesses:
JOHN H. SCHISLER,
CHARLEY E. SCHAIBLE.

Copies of this patent may be obtained for five cents each, by addressing the "Commissioner of Patents, Washington, D. C."